April 25, 1950     J. BARKER ET AL     2,505,377
ROTATING CUTTING DISK TYPE MOWER
Filed Jan. 29, 1946     2 Sheets-Sheet 1
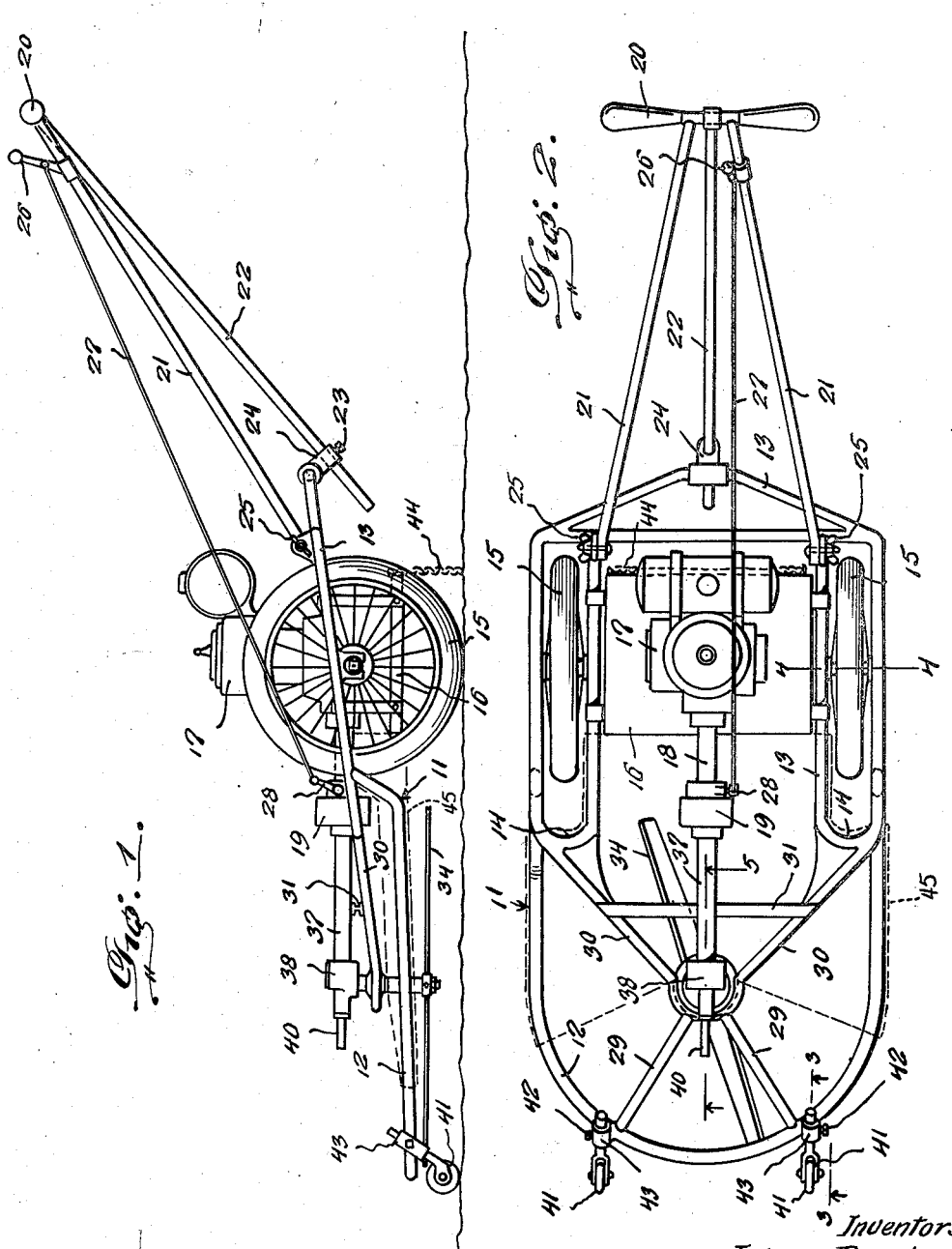
Inventors
John Barker,
Morris Ghere,
Attorneys

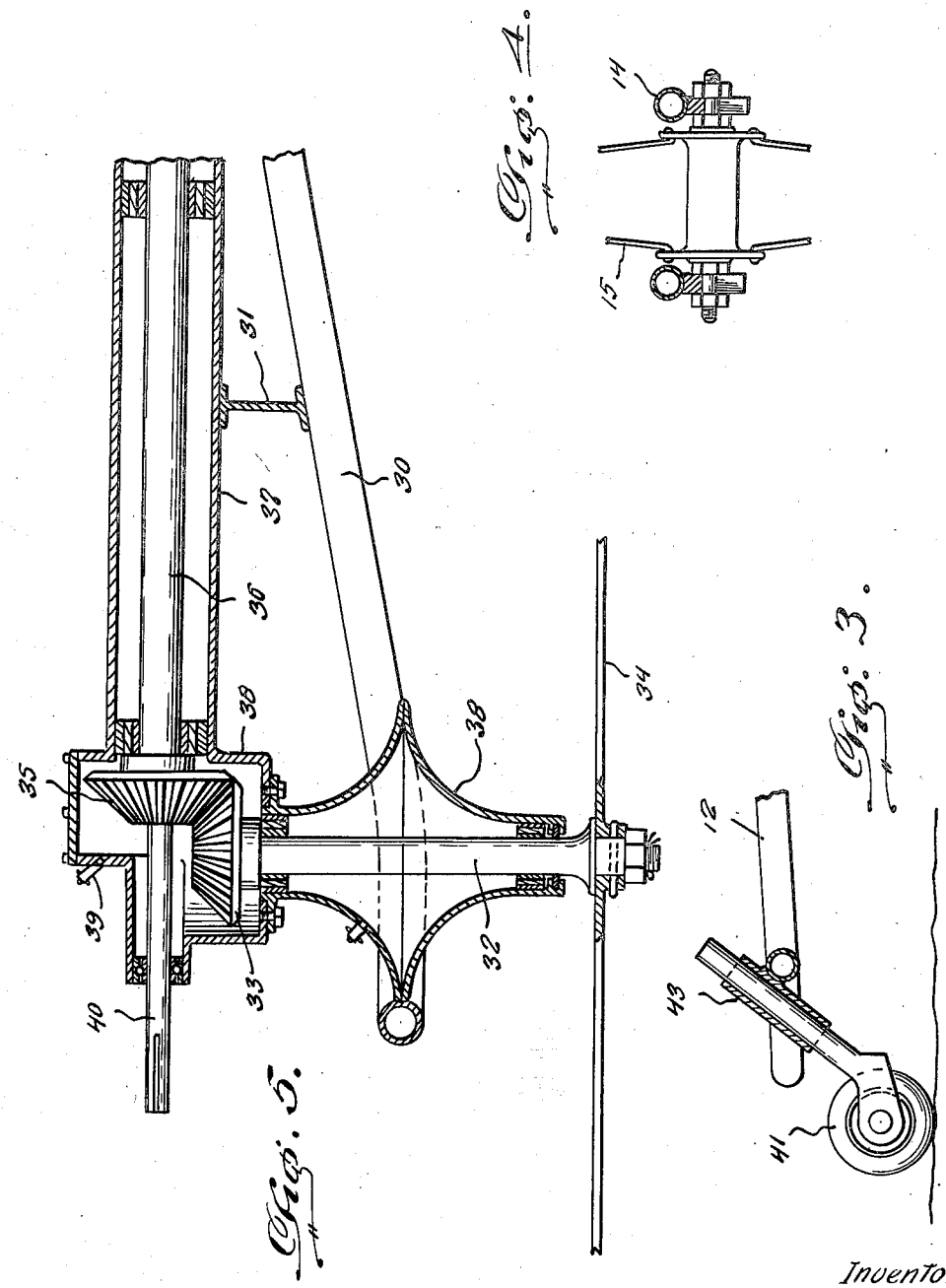

Patented Apr. 25, 1950

2,505,377

UNITED STATES PATENT OFFICE 2,505,377

ROTATING CUTTING DISK TYPE MOWER

John Barker and Morris Ghere, Centralia, Ill., assignors, by mesne assignments, to Yazoo Manufacturing Company, Inc., Jackson, Miss., a corporation of Mississippi Application January 29, 1946, Serial No. 643,999

2 Claims. (Cl. 56—25.4)

This invention relates to power driven lawn-mowers, and more particularly to a lawn-mower of the type which has its cutting blade mounted for rotation in a horizontal plane adjacent the ground.

A main object of the invention is to provide a novel and improved lawn-mower of simple and safe construction which is highly efficient in operation and which is very easy to operate and control.

A further object of the invention is to provide an improved power driven lawn-mower of the rotary blade type, said lawn-mower being readily adjustable to suit a wide range of operating conditions and having a novel arrangement of means for controlling the power for the cutting blade, the apparatus being mounted in a very sturdy manner yet being light in weight.

Further objects and advantages of the invention will appear from the following description and claims, and from the accompanying drawings, wherein:

Figure 1 is a side elevational view of a lawn-mower constructed in accordance with the present invention.

Figure 2 is a top plan view of the lawn-mower structure of Figure 1.

Figure 3 is a detail view taken on line 3—3 of Figure 2.

Figure 4 is a detail view taken on line 4—4 of Figure 2.

Figure 5 is a detail view taken on line 5—5 of Figure 2.

Referring to the drawings, 11 designates a supporting frame which may be constructed of steel tubing or the like, said frame comprising a forward loop portion 12 which is substantially horizontal, and a rearward portion 13 which is inclined upwardly at a small angle with respect to forward portion 12. Rear portion 13 comprises a pair of wheel loops 14, 14 in each of which is journalled a pneumatic-tired wheel 15 of substantial diameter, the wheels 15, 15 supporting most of the weight of the apparatus. Supported between the inner arms of loops 14, 14 is a horizontal platform 16 upon which is mounted a gasoline engine 17. The shaft of engine 17 extends through a protective tubular housing 18 to a conventional clutch device 19 which may be of the disc type.

Adjustably and removably secured to the rear portion of frame 11 is a handle structure comprising a transverse handle bar 20 secured to the rear of frame 11 by a pair of inclined side bar members 21, 21 and a center bar member 22. Center bar member 22 may be adjusted in effective length by a set-screw 23 carried by a link member 24 pivotally secured to the rear end of frame 11, bar member 22 passing through link member 24 and being clamped therein by screw 23. Side bar members 21, 21 are secured to frame 11 by bolts having wing nuts 25, 25 and are pivotally connected to handle bar 20. By longitudinally adjusting the position of center bar 22 the angular position of the handle bar supporting framework may be regulated, and the height of handle bar 20 may thus be adjusted to suit the operator.

Mounted on one of the side bars 21 adjacent handle bar 20 is a control lever 26 connected by a tie member 27, which may be either a rigid rod or a flexible cable, to a clutch control lever 28 carried by clutch device 19. When the operator pulls lever 26 to its downward position clutch device 19 is disengaged. When lever 26 is released clutch 19 returns to its normal engaged position.

Forward loop portion 12 of frame 11 carries at its center a housing 38 supported by radial bars 29, 29 and 30, 30 which are connected to the outer portions of frame 11. A transverse I-beam 31 connects radial bars 30, 30 to stiffen the supporting structure for housing 28. Journalled in housing 38 is a vertical shaft 32 carrying at its upper end a bevel gear 33 and at its lower end the cutter blade 34. Meshing with bevel gear 33 is a bevel gear 35 carried by a horizontal shaft 36 connected to the driven element of clutch 19. Shaft 36 is contained in a tubular housing 37 which is secured to and supported on transverse I-beam 31. Bevel gears 33 and 35 are contained in an appropriate housing 38 into which lubricant may be admitted by a suitable fitting 39. As shown in Figure 5, the end of shaft 36 protrudes through the forward wall of housing 38. Shaft portion 40 may be employed as a power take-off shaft to drive auxiliary equipment such as hedge clippers, sprayers, and the like.

Appropriate roller bearings are provided for the various rotating shafts to minimize rotational friction thereof.

The forward portion of frame loop 12 is supported by a pair of casters 41, 41 adjustably secured in suitable sleeves 43, 43 by means of set screws 42, 42 to the loop. The height of loop 12 above ground level, and hence the height of cutting blade 34, may be regulated by adjusting the positions of engagement of set screws 42, 42 with respect to the supporting shafts of the casters 41, 41. Sleeves 43, 43 are rigidly secured, as by welding, to frame loop 12.

Suspended from the rear edge of platform 16 and extending for substantially the full width thereof is a flexible guard member 44 of interconnected chain links or the like, which extends substantially to ground level. Guard member 44 prevents injury to the operator in the event of breakage of blade 34.

Platform 16 is preferably of wood or plywood, whereby vibration of the gasoline engine 17 is deadened.

Wheels 15, 15 may be heavy duty balloon tire bicycle wheels.

A shield 45 of sheet metal or the like may be employed to cover the side and top rear portions of the frame adjacent the rotary cutting blade 34. It has been found that the performance of the lawn mower has been considerably enhanced by the use of such a shield. When a shield such as 45 is used, the shield should not cover the forward portion of the frame but should preferably leave exposed an arc of the cutting blade path of travel equivalent almost to a semicircle at the forward portion of the lawnmower.

While a specific embodiment of a power driven lawn-mower has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a lawn mower, a wheeled frame having a horizontally-disposed forward loop portion and a rearward portion inclined with respect to said forward portion and secured thereto, power means carried by the rearward portion of said frame, a plurality of radially-disposed bars carried by the forward looped portion, a housing interposed between said bars and supported by the latter, a horizontally-disposed cutter blade arranged wholly within a horizontal plane and confined in said forward looped portion, said cutter blade being mounted intermediate its ends for rotation about a vertical axis, means operatively connecting said power means to said cutter blade for rotating the latter, said means comprising a vertically-disposed rotatable shaft carried by said housing and having its lower end connected to said cutter blade, a first bevel gear secured to the upper end of said shaft, a second bevel gear arranged in meshing engagement with said first bevel gear, a horizontally-disposed shaft having one end secured to said second bevel gear, a clutch secured to the other end of said horizontally-disposed shaft, and a shaft operatively connecting said clutch to said power means, and means carried by the forward portion of said frame for adjusting the level of said cutter blade relative to the lawn, said last named means embodying a pair of rotatably supported casters arranged in side by side spaced relation with respect to each other and mounted on said frame for sliding movement, and hand actuable means carried by said frame and engageable with each of said casters for positioning the latter in a select position of said sliding movement.

2. In a lawn mower, a wheeled frame having a horizontally disposed forward loop portion and a rearward portion inclined with respect to said forward portion and fixedly secured to the latter, power means carried by the rearward portion of the frame, a cutter blade arranged wholly within a horizontal plane and confined in said forward looped portion, said cutter blade being mounted intermediate its ends for rotation about a vertical axis, and means carried by the forward portion of said frame for adjusting the level of said cutter blade relative to the lawn, said last named means embodying a pair of rotatably supported casters arranged in side by side spaced relation with respect to each other and mounted on said frame for sliding movement, and hand actuable means carried by said frame and engageable with each of said casters for holding the latter in a select position of said sliding movement.

JOHN BARKER.
MORRIS GHERE.

REFERENCES CITED

The following references are of record in the file of this patent:

UNITED STATES PATENTS

| Number | Name | Date |
|---|---|---|
| 625,584 | Miller | May 23, 1899 |
| 1,992,494 | Lundin | Feb. 26, 1935 |
| 2,017,524 | Bolens | Oct. 15, 1935 |
| 2,076,056 | Woodford | Apr. 6, 1937 |
| 2,265,545 | Phelps | Dec. 9, 1941 |
| 2,287,126 | Packwood | June 23, 1942 |
| 2,302,472 | Power | Nov. 17, 1942 |
| 2,403,236 | Phelps | July 2, 1946 |

FOREIGN PATENTS

| Number | Country | Date |
|---|---|---|
| 416,140 | Great Britain | Sept. 13, 1934 |